No. 784,143. PATENTED MAR. 7, 1905.
C. R. DAVIS.
CORN PLANTER.
APPLICATION FILED MAR. 30, 1904.
3 SHEETS—SHEET 1.
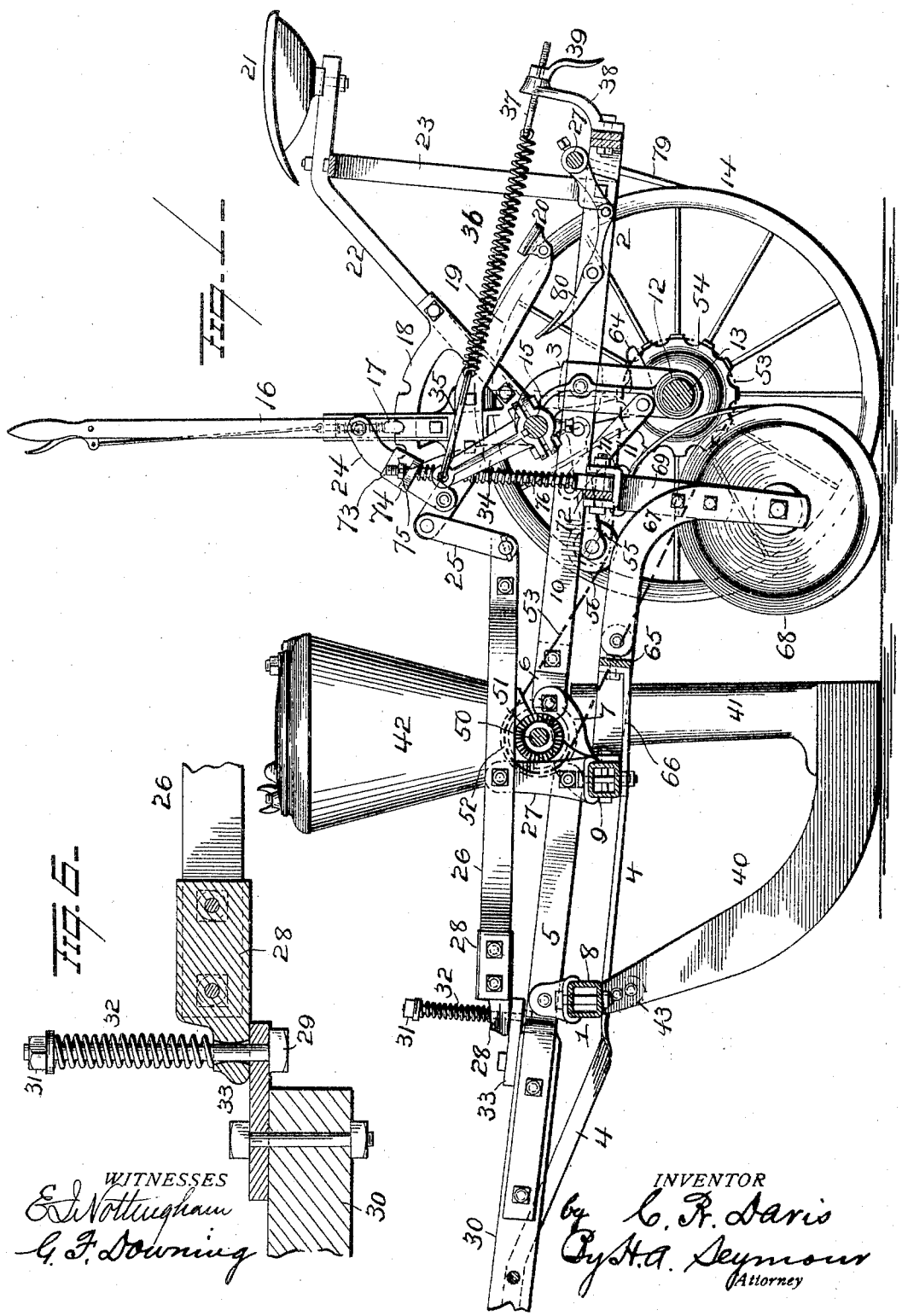

No. 784,143. PATENTED MAR. 7, 1905.
C. R. DAVIS.
CORN PLANTER.
APPLICATION FILED MAR. 30, 1904.
3 SHEETS—SHEET 2.
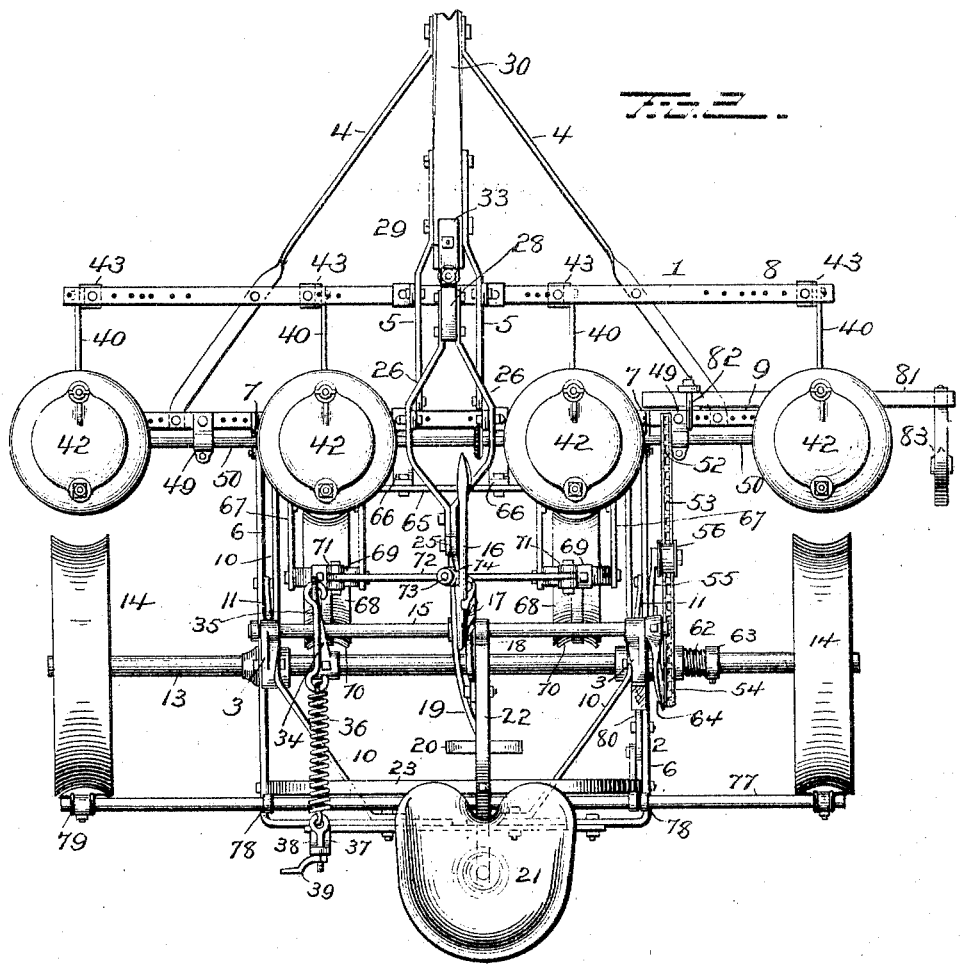
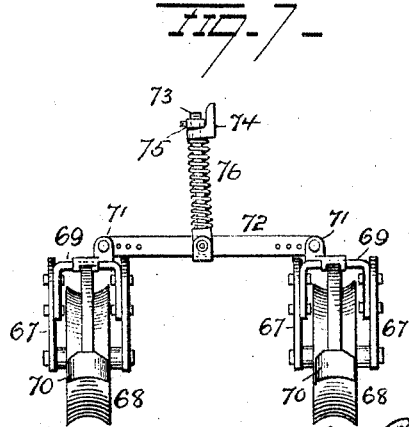
WITNESSES
E. J. Nottingham
G. F. Downing
INVENTOR
C. R. Davis
by H. A. Seymour
Attorney

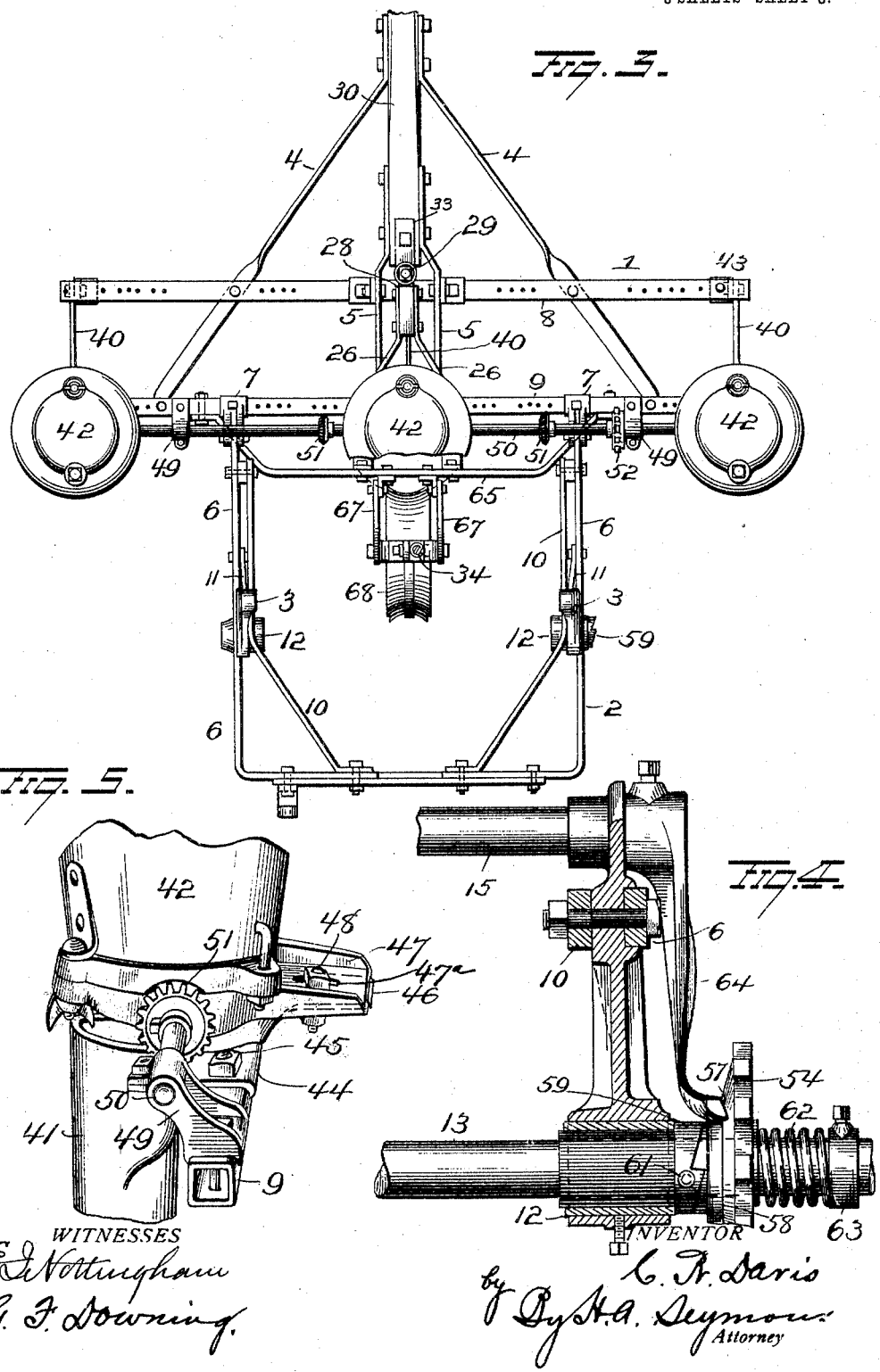

No. 784,143.                                                                    Patented March 7, 1905.

UNITED STATES PATENT OFFICE.

CALVIN R. DAVIS, OF SOUTH BEND, INDIANA, ASSIGNOR TO OLIVER CHILLED PLOW WORKS, OF SOUTH BEND, INDIANA.

CORN-PLANTER.

SPECIFICATION forming part of Letters Patent No. 784,143, dated March 7, 1905.

Application filed March 30, 1904. Serial No. 200,758.

*To all whom it may concern:*

Be it known that I, CALVIN R. DAVIS, a resident of South Bend, in the county of St. Joseph and State of Indiana, have invented certain new and useful Improvements in Corn-Planters; and I do hereby declare the following to be a full, clear, and exact description of the invention, such as will enable others skilled in the art to which it appertains to make and use the same.

My invention relates to an improved cornplanter, an object of the invention being to provide improvements of this character which can be changed from a three-row to a four-row planter, and vice versa, as desired, and which embodies certain novel features of construction and combinations and arrangements of parts, as will be more fully hereinafter described, and pointed out in the claims.

In the accompanying drawings, Figure 1 is a view in longitudinal section illustrating my improvements. Fig. 2 is a top plan view with the parts arranged as a four-row planter. Fig. 3 is a broken plan view showing the parts adjusted to form a three-row planter. Fig. 4 is an enlarged sectional view illustrating the clutch-controlling mechanism. Fig. 5 is an enlarged view illustrating the construction and attachment of a seed-hopper and shank or boot. Fig. 6 is a view in longitudinal section illustrating the connection of liftingbars with the tongue, and Fig. 7 is a detached view of the covering-wheels and parts connected therewith.

My improved planter has a front frame 1 and rear frame 2, the former comprising parallel angular tubular bars 8 and 9, connected by the inclined tongue-braces 4 and 5, the latter at the ends of the tongue and the former secured to the tongue some distance from its end. The rear frame 2 comprises side bars 6, pivotally attached to brackets 7 on the rear of bars 9, bent at their ends, overlapped, and secured together and reinforced by bars 10, which are spaced from bars 6 by blocks, as shown at the longitudinal portions of the bars, and at their rear ends are bent and secured to the rear of the frame-bars 6 to effectually brace the same.

Between the bars 6 and 10 of rear frame 2 brackets 3 are securely bolted, are braced by links 11, and have bearings 12 removably secured therein and mounted on axle 13, supported in wheels 14, said bearings being removable, so that they can be replaced in the event of wear. The upper ends of said brackets 3 provide bearings for a shaft 15, to which a hand-lever 16 is secured and provided with spring-pressed detent 17 to engage a notched segment 18 and hold the lever at any adjustment. Lever 16, near the shaft 15, is made with a wide face, to which a foot-lever 19 is securely bolted between its ends, and provided at its rear end with a treadle 20 in convenient reach of the operator on seat 21, carried by bars 22 and 23, as clearly shown. The footlever 19 is connected near its forward end with hand-lever 16 by a link 24, and the forward end of the foot-lever 19 is connected by a link 25 with lifting-bars 26. These liftingbars 26 are secured to brackets 27 on rear bar 9 of front frame 1 and at their forward ends have a block 28 secured between them, said block made with an opening to receive an upright spring-rod 29, secured in a rearwardly-extending plate 33 on tongue 30. Said rod 29 is screw-threaded at its upper end to receive a nut 31 to adjust the tension of a spring 32, located on the rod between the nut and block 28, elastically holding the block 28 on tongue-plate 33, yet permitting of the desired yielding movement to impart elasticity to frame 1 and parts carried thereby.

An arm 34 is keyed to shaft 15 and securely clamped thereon and connected at its upper end by a hook 35 with a counterbalance-spring 36, which latter has an eyebolt 37 at its rear end supported in a bracket 38 at the rear of frame 2, and a set-nut 39 is located on said bolt to adjust the tension of the spring 36, which assists the operator to raise frame 1, as will be readily understood.

When the planter is employed as a four-row planter, four runners or furrow-openers 40, with shanks 41 and seed-hoppers 42, are secured to bars 8 and 9 of frame 1 and spaced equidistant apart, said bars being provided with a large number of bolt-openings, which will permit of the adjustment of the runner and hoppers to locate the one mechanism at the center, as shown in Fig. 3, and permit the others to be variously placed according to the space desired between the rows. Each runner 40 has a lateral extension at its forward end made with a bolt-opening to receive a bolt 43 in any of the bolt-openings of bar 8 to secure the same thereto, and the runner shank or boot 41 is secured to bar 9, as will now be described and which is most clearly shown in Fig. 5. The runner-shanks 41 have integral flanges 44 to overlap bar 9 and be secured thereto by bolts 45, and said flanges 44 are made with integral tongues 46 to enter a grooved extension 47 on the under side of the seed-hopper 42 and is secured therein by a bolt 48, said bolt being passed through a slot 47ª in extension 47 to permit of the necessary adjustment of the seed-hopper to exactly position the same.

Supported in suitable bearings 49 on bar 9 is a shaft 50, having beveled pinions 51 secured thereon for transmitting motion to the seed-droppers in hoppers 42. This shaft 50 also has fixed thereon a sprocket-wheel 52, to which motion is transmitted by an endless sprocket-chain 53, passed around a sprocket-wheel 54, loose on axle 13, and a pivoted arm 55 carries a roller 56, resting on said chain to take up the slack therein. As shown clearly in Fig. 4, sprocket-wheel 54 has a cam-face 57 and a clutch member 58 on one side, said clutch member adapted to coöperate with a coöperating clutch member 59 against bearing-sleeve 12, secured to axle 13 by a pin 61, and a coiled spring 62 is located on said axle 13 between an adjustable collar 63 and sprocket-wheel 54 to press the latter into position to compel the clutch members to interlock and compel the sprocket-wheel 54 to turn with the axle. A curved arm 64 is secured on shaft 15 and is adapted when the foot-lever 19 or hand-lever 16 is operated to raise the front frame to move against the cam-face 57 of sprocket 54 and move the latter on axle 13 to release the clutch members, and thereby stop the seed-dropping mechanism when the front frame is elevated.

A bent bar 65, secured to the rear of bar 9, is strengthened by braces 66 and has curved forks 67, pivoted to lugs thereon and connected with journals in covering-wheels 68, the traction-wheels 14 serving as covering-wheels for the outside runners and two intermediate covering-wheels 68 being provided when the device is arranged as a four-row planter. Yokes 69 are secured to forks 67, straddle covering-wheels 68, and carry scrapers 70, and bifurcated brackets 71 on said yokes 69 are connected by a bar 72, and a spring-rod 73 is connected with the center of bar 72 and projects up to and through a pivoted angle-plate 74 on link 24 and has a set-screw collar 75 on the rod 73 above plate 74 to limit the movement of the rod in the plate and serve as a shoulder to permit the plate to elevate the rod and covering-wheels when the front frame is raised. A coiled spring 76 is located on this rod 73 below the plate 74 and exerts a downward pressure on the covering-wheels, the tension of said spring being adjusted by screw-collar 75.

A crank-shaft 77 is supported in bearing 78 at the rear of frame 2 and has scrapers 79 fixed thereto to clean wheels 14, and said shaft is controlled by a foot-lever 80 to force the scrapers tightly against the wheels when desired.

A marker-bar 81 is adjustably secured to bar 9 at either side of the frame 1 by means of clips 82 and carries at its outer end a spring-marker 83, adapted to mark the ground for the next row, said marker-spring being of sufficient elasticity to enable it to ride over rocks and like obstructions and assume its normal marking position.

The operation of my improvements is as follows: Motion is transmitted from axle 13 by sprocket-wheel 54, chain 53, and sprocket-wheel 52 to shaft 50 and by beveled gears 51 to the seed-dropping mechanism at the bottom of hoppers 42, and it will be observed that the shaft 50 is provided with a beveled gear 51 at the center, as well as on each side thereof, so as to operate the seed-dropping mechanism, whether the parts be arranged as a three or four row planter, and it will also be observed that lifting-bars 26 are bowed to straddle the hopper when in a central position, as clearly shown. To elevate front frame 1 and feeding mechanism carried thereby, the operator moves foot-lever 19 or hand-lever 16, or both, to exert a lifting action on link 25 and the rear end of lifting-bars 26, which latter fulcrum on the tongue-plate 33 and through the medium of brackets 27, connected with bar 9, elevate the frame and support the weight thereof on the rear frame 2 and traction-wheels 14. The movement of the levers to raise the front frame 1 turns shaft 15 (which movement is assisted by spring 36) and moves arm 64 against the cam-face 57 of sprocket-wheel 54, moving the latter on axle 13 to disconnect the clutch members 58 and 59 and stop the seed-dropping mechanism. When the levers are moved in the opposite direction, the operation is just the reverse, coiled spring 62 moving the clutch members together and starting the seed-dropping mechanism when arm 64 is moved out of the way by the turning of shaft 15.

When the parts are arranged as a three-row planter with one seed-hopper and coöperating parts at the center of the machine, but one covering-wheel 68 is employed, and the spring-rod 73 is connected directly with the bifurcated bracket 71 on the yoke 69 thereof.

A great many changes might be made in the general form and arrangement of the parts described without departing from my invention, and hence I would have it understood that I do not wish to restrict myself to the precise details set forth, but consider myself at liberty to make such slight changes and alterations as fairly fall within the spirit and scope of my invention.

Having fully described my invention, what I claim as new, and desire to secure by Letters Patent, is—

1. A convertible planter comprising front and rear frames pivotally connected together, an axle mounted in the rear frame, covering-wheels on said axle, feeding mechanism on the front frame near the ends thereof, intermediate feeding mechanism, means for removably attaching said intermediate feeding mechanism at the center of the front frame and at each side of the center of said front frame, intermediate removable covering-wheels, and means for alining the intermediate covering-wheels with the intermediate feeding mechanism.

2. In a planter, the combination with a rear frame and wheels for supporting the same, of a front frame comprising transverse parallel bars made with a large number of bolt-openings at various points, runners and shanks having perforated projections to receive bolts and secure them to the bars, seed-hoppers above the shanks, grooved extensions on the seed-hoppers, and tongues on the shanks to be secured in the grooves of the hopper extensions and secure the hoppers in position over the shanks.

3. In a planter, the combination with a rear frame supported on wheels, of a front frame hinged to the rear frame, feeding mechanism carried by the front frame, a tongue secured to the front frame, a lifting-lever on the rear frame, lifting-bars secured to a block at one end and connected at their other end with said lifting-lever, a vertical rod on the tongue and projecting through an opening in the block, a spring on the rod exerting downward pressure on the block, and said lifting-bars secured between their ends to the front frame.

4. In a planter, the combination with a rear frame supported on wheels, of a front frame hinged to the rear frame and carrying feeding mechanism, of a shaft carried by the rear frame, a hand-lever secured on the shaft, a foot-lever extending transversely across the hand-lever and secured thereto above said shaft, mechanism connected with the foot-lever to compel the front frame to raise or lower when either of said levers is moved, an upwardly-projecting arm on said shaft, and a counterbalance-spring connected to said arm extending rearwardly therefrom and connected with the rear frame.

5. In a planter, the combination with a rear frame supported on wheels, of a front frame hinged to the rear frame, seed-dropping mechanism on the front frame, a sprocket-wheel loose on the rear-frame axle and movable laterally thereon, a clutch member on the sprocket-wheel, a spring normally holding the said clutch member in locked engagement with a coöperating clutch member fixed on the axle, a sprocket-chain transmitting motion from the sprocket-wheel to the seed-dropping mechanism, a shaft on the frame, a lever secured to said shaft and adapted to raise and lower the front frame, and an arm on the shaft adapted when the lever is moved to raise the front frame, to move against the sprocket-wheel and separate the clutch members thereby stopping the seed-dropping mechanism.

6. In a planter, the combination with a rear frame supported on wheels, of a front frame hinged to the rear frame and carrying feeding mechanisms, a lever on the rear frame to raise and lower the front frame, covering-wheels, forks carrying said covering-wheels, and a spring-rod connecting said covering-wheel forks with said lever.

7. A convertible planter, comprising front and rear frames pivotally connected together, an axle mounted in the rear frame, combined traction and covering wheels in which said axle is mounted, feeding mechanism attached to the front frame at or near the ends thereof, removable feeding mechanisms intermediate the ends of the front frame, means for attaching one or more of said removable feeding mechanisms to the front frame intermediate of the ends thereof, intermediate covering-wheels to coöperate with said intermediate feeding mechanism, and means for removably connecting said intermediate covering-wheels to the front frame.

8. In a planter, the combination with a rear frame, an axle supporting the frame and wheels supporting the axle, of a front frame hinged to the rear frame and carrying seed-dropping mechanisms, a sprocket-wheel clutched to the axle, a sprocket-chain connecting the sprocket-wheel with the seed-dropping mechanism, a hinged arm on the rear frame carrying a roller at its free end resting on the chain to take up slack therein, a lever on the rear frame for raising and lowering the front frame and means controlled by said lever for throwing the sprocket-wheel out of its clutched engagement with the axle when the front frame is raised.

In testimony whereof I have signed this specification in the presence of two subscribing witnesses.

CALVIN R. DAVIS.

Witnesses:
EDWIN NICAR,
FRANCIS C. WIPPOLD.